(12) United States Patent
Carraro

(10) Patent No.: US 10,427,768 B2
(45) Date of Patent: Oct. 1, 2019

(54) SHARK DETERRENT

(71) Applicant: Landoa Pty Ltd, Mayfield, New South Wales (AU)

(72) Inventor: Robert Joseph Carraro, Nelson Bay (AU)

(73) Assignee: LANDOA PTY LIMITED, Mayfield, NSW (AU)

( * ) Notice: Subject to any disclaimer, the term of this patent is extended or adjusted under 35 U.S.C. 154(b) by 0 days.

(21) Appl. No.: 15/573,416

(22) PCT Filed: May 13, 2016

(86) PCT No.: PCT/AU2016/050366
§ 371 (c)(1),
(2) Date: Nov. 10, 2017

(87) PCT Pub. No.: WO2016/179666
PCT Pub. Date: Nov. 17, 2016

(65) Prior Publication Data
US 2018/0154990 A1 Jun. 7, 2018

(30) Foreign Application Priority Data

Dec. 17, 2015 (AU) ................................ 2015905249
May 13, 2016 (AU) ................................ 2015901735

(51) Int. Cl.
| | |
|---|---|
| *B63C 9/00* | (2006.01) |
| *A01M 29/08* | (2011.01) |
| *B32B 37/12* | (2006.01) |
| *B63B 35/79* | (2006.01) |
| *A41D 13/01* | (2006.01) |

(Continued)

(52) U.S. Cl.
CPC ............... *B63C 9/00* (2013.01); *A01M 29/08* (2013.01); *A41D 13/01* (2013.01); *A41D 13/012* (2013.01); *B32B 7/12* (2013.01); *B32B 37/12* (2013.01); *B63B 9/00* (2013.01); *B63B 35/7909* (2013.01); *B32B 2307/416* (2013.01);

(Continued)

(58) Field of Classification Search
CPC . B63C 9/00; B63C 2009/0088; A41D 13/012; A41D 13/01; B32B 7/12; B32B 37/12; B32B 2605/00; B32B 2307/416; B63B 9/00; B63B 35/7909; B63B 35/7906; A01M 29/08
See application file for complete search history.

(56) References Cited

U.S. PATENT DOCUMENTS 5,882,774 A * 3/1999 Jonza .................... B29C 55/023
428/212
7,811,144 B2 10/2010 Cavanaugh
(Continued)

FOREIGN PATENT DOCUMENTS

| | | |
|---|---|---|
| AU | 2008200585 A1 | 12/2008 |
| WO | 2009100303 A1 | 8/2009 |

(Continued)

*Primary Examiner* — Anthony D Wiest
(74) *Attorney, Agent, or Firm* — David Woodral; Gable Gotwals

(57) ABSTRACT

Disclosed is an apparatus that is able to generate an image to deter a shark from attacking a watercraft (e.g. a surfcraft). Also disclosed are methods of manufacturing and retrofitting watercraft to include the apparatus that is able to generate an image to deter a shark from attacking the watercraft.

19 Claims, 17 Drawing Sheets

(51) Int. Cl.
*A41D 13/012* (2006.01)
*B32B 7/12* (2006.01)
*B63B 9/00* (2006.01)

(52) U.S. Cl.
CPC ....... *B32B 2605/00* (2013.01); *B63B 35/7906* (2013.01); *B63C 2009/0088* (2013.01)

(56) References Cited

U.S. PATENT DOCUMENTS

| | | | |
|---|---|---|---|
| 8,360,587 | B2 | 1/2013 | Lewis, Jr. et al. |
| 8,460,043 | B2 * | 6/2013 | Halliday ................ A41D 13/00 43/42.32 |
| 2004/0005825 | A1 | 1/2004 | Hasted |
| 2006/0135010 | A1 | 6/2006 | Moeller et al. |
| 2016/0000056 | A1 * | 1/2016 | Hoffman ................ B63B 35/14 43/42.33 |

FOREIGN PATENT DOCUMENTS

| | | | |
|---|---|---|---|
| WO | 2009146491 | A1 | 12/2009 |
| WO | 2014134677 | A1 | 9/2014 |

\* cited by examiner

SHARK DETERRENT

TECHNICAL FIELD

An apparatus and method for deterring a shark are disclosed. The apparatus comprises a first buoyant portion providing a support surface adapted to support a user thereon and a second portion locatable at the first portion able to generate an image. The apparatus can be employed in applications such as surfing, boating, fishing, rescue, and generally for watercraft locatable on a water surface.

BACKGROUND ART

The number of humans injured or killed by sharks each year has increased with the increase in aquatic activities. This has escalated the number of potential interactions with large predatory sharks. The main species that have been implicated in fatalities are Great Whites, Tiger, Bull, and other Whaler sharks. Hunting strategies and locations vary between species with Bull sharks more likely to be involved where turbid waters are present at river mouths and canals. Great White Sharks operate in more open waters and may mistake humans for their more usual prey such as seals. The origins of many attacks are from below and behind the target. The silhouette of a surfer on a surfboard may resemble a seal on the surface. Upon realisation that the high fat content blubber expected is not present, the victim is often released immediately with no further attack taking place. This is known as "bite and spit" and, although the attack is not continued, sufficient damage may be inflicted to cause a mortal loss of blood. Great White Sharks that pose the most danger appear to be sub-adults of 3 to 3.5 m. Individuals at this stage of growth begin to change their feeding habits from smaller fish to larger prey. This can involve experimentation on what can be eaten. It is highly uncommon but not unknown for a human to be consumed by a shark. Also, where rescuers come to the aid of the victim, they are rarely attacked. This suggests that the attack is an error in assessment by the shark on the suitability of the prey.

Another form of attack is one in which an inquisitive shark may mouth an object lightly in order to determine whether it is potential prey. As with the previous examples, the attack is not always carried through to conclusion. Attacks by smaller individual sharks may be related to feeding in which schools of fish are chased and herded in order to separate individuals from the school. In situations where people are in the water close to where feeding or stalking is taking place, feet or hands may be bitten. Sharks may at times attempt to assert dominance, directing an attack on a surfboard or other watercraft, leading to an accidental bite of a person during the event. Small bites to the limbs may result in high blood loss and, if treated quickly, may not be fatal. However, if the bite is located higher on the thigh and the femoral artery is severed, mortal blood loss can take only minutes.

Since the 1940's numerous efforts have been made to find a method to protect humans in the water from predatory sharks. Many methods appeared to be initially successful only for the sharks to become acclimated. Some methods deflected some species while attracting others, or failed in multiple locations.

The above references to the background art do not constitute an admission that the art forms part of the common general knowledge of a person of ordinary skill in the art. The above references are also not intended to limit the application of the apparatus and method as disclosed herein.

SUMMARY

Disclosed herein is an apparatus for deterring a shark. The apparatus may comprise a first buoyant portion providing a support surface adapted to support a user thereon; and a second portion locatable at the first portion, the second portion able to generate an image. In some forms, the second portion may be able to camouflage the apparatus from underneath (i.e. below the apparatus in use) by generating an image.

The second portion may generate an image as a result of light falling thereupon. The second portion may reflect at least some of that light. The second portion may reflect light differentially there-across (e.g. reflecting more or less light in different regions and/or reflecting light at different angles in different regions). The second portion may also cause light to be refracted as it reflects. Such refraction may vary across the second portion.

In some other forms the second portion may comprise light generating material (e.g. it may comprise a luminescent, self-illuminating and/or photo emissive material). The expression "able to generate an image" should thus be interpreted broadly.

The image generated (e.g. produced/reflected) by the second portion may be of the surrounding environment below the apparatus in use to camouflage the apparatus.

In some forms, the second portion may provide a reflective surface adapted to reflect the image of the surrounding environment to thereby generate the image.

In some forms, the reflective surface may comprise a non-uniform reflective value.

Ins some forms, the reflective surface may comprise a first reflective portion having a first reflective value and a second reflective portion having a second reflective value. The first and second reflective values may vary such that the first and second reflective portions provide a varying level of reflectivity.

In some forms, the reflective surface may be in the form of a mirror film.

In some forms, the mirror film may comprise ink printed thereon to provide the varying level of reflectivity.

In some forms, the mirror film comprises a plurality of apertures to provide the varying level of reflectivity.

In some forms, the mirror film may be coated with resins of differing opaque levels to provide the varying level of reflectivity.

In some forms, the mirror film may comprise an etched pattern to provide the varying level of reflectivity.

In some forms, the mirror film may comprise an embossed pattern to provide the varying level of reflectivity.

In some forms, the second portion can generate an image of an approaching shark to deter the shark from attacking the apparatus. The generated image may be of the approaching shark itself to surprise the approaching shark, thereby deterring it from continuing an attack run towards the apparatus.

In some forms, the second portion may provide a reflective surface adapted to reflect the image of an approaching shark to thereby generate the image. The reflective surface may be able to both generate an image of the surrounding environment below the apparatus in use to camouflage the apparatus and to generate an image of an approaching shark to deter the shark from attaching the apparatus. A third function of the reflective surface may be to confuse a shark as to the exact location of the apparatus when the shark is within close proximity of the apparatus. In other words, the reflective surface can perform a three-fold function.

In some forms, the mirror film may be thin and negligible in weight relative to the apparatus, thereby providing a cost effective device that can be applied to an apparatus (e.g. a surfboard, surf-craft, boat, etc.) without affecting the weight, and therefore overall performance, of the apparatus.

In an alternative form, the reflective surface may be sprayed onto the first portion, or may comprise reflective (e.g. microscopic) particles dispersed in a carrier that is applied to the first portion, or may comprise a reflective paint, etc.

In some forms, the second portion may further comprise a magnifier for magnifying the generated image. The magnifier may be able to magnify the generated image of an approaching shark to further enhance the deterrence effect.

In some forms, the second portion may further comprise an adhesive layer for connecting the mirror film to the first portion. This allows for the mirror film to be adhered within or onto the outside of the first portion.

In some forms, the apparatus may further comprise a protective layer for protecting the first buoyant portion and second portion. The protective layer may comprise a bottom surface, a deck surface for supporting a user thereon, and rail portions connecting the bottom and deck surfaces.

In some forms, the mirror film may be disposed between the bottom surface of the protective layer and the first portion such that, in use, an underside of the apparatus is able to generate the image. In some forms, the magnifier may be disposed between the mirror film and the protective layer for magnifying the generated image.

In some forms, the mirror film may be further disposed between the rail portions of the protective layer and the first portion. This arrangement allows for the rail portions to contribute to the generated image thereby enhancing the camouflage effect in use.

In some forms, the mirror film may be is adhered to the bottom surface of the protective layer. This allows for the mirror film to be applied to pre-glassed surfboards.

Also disclosed herein is a device configured to be attached to an underside of a watercraft. The device comprises a reflective layer adapted to generate an image to deter a shark from attacking the watercraft. In this form, the device can be installed on the underside of a preformed watercraft such that, in use, the underside of the watercraft is able to reflect and thereby generate the image (e.g. of the surrounding environment or of an approaching shark) to deter the shark from continuing an attack run on the watercraft. The device may take the form of a film or self-adhesive layer as set forth above.

Also disclosed herein is a method of retrofitting a watercraft for deterring a shark. The method may comprise the step of adapting an underside surface of the watercraft to form a surface able to generate an image. Advantageously, the disclosed method allows for preformed watercraft to be adapted to deter a shark from attacking the watercraft.

In some forms, the method may comprise locating a flexible mirror film adjacent to the underside of the watercraft. In another form, the method may comprise locating reflective paint adjacent the underside of the watercraft. Such forms of the method can provide a cost effective means of retrofitting a watercraft for deterring a shark, but that does not impact on the performance of the watercraft.

In some forms, the method may further comprise adhering the flexible mirror film onto the underside of the watercraft. For example, spray on glue can be used to adhere the mirror film to the underside of the watercraft, or the film may be backed with an adhesive.

In some forms, the method may further comprise locating a magnifying layer over the flexible mirror film. The magnifying layer can be applied simultaneously with the flexible mirror film (i.e. they can be integrally formed with one another), or may be applied as the second step in a two-step process.

In some forms, the method may further comprise locating a protective layer, such as in the form of resin, over the adapted surface. When applied to a surfboard or surf-craft, this allows for continuity of material between the deck, rails and bottom of the surfboard, thereby providing a smooth integration (i.e. preventing sharp edges) of the film to the surfboard. Additionally, the protective layer can protect the mirror film from damage (i.e. scratches).

Also disclosed herein is a method of constructing a watercraft for deterring a shark. The method may comprise the step of locating a first layer of material at a buoyant portion, wherein the first layer of material is able to generate an image.

In some forms, the method may further comprise locating a second layer of material over the first layer of material to fix the first layer of material to an underside of the buoyant portion of the watercraft.

In one form, the first layer of material may be a metallic paint that is able to generate an image of the surrounding environment and/or of an approaching shark. When applied to a surfboard or surf-craft, the metallic paint can be located on the foam core or the fibreglass prior to the application of the final coat of resin, or it can be applied to or within the final coat of resin. In another form, the first layer of material may be a mirror film that is able to generate an image of the surrounding environment and/or of an approaching shark. When in this form and applied to a surfboard during manufacture, the mirror film can be located (e.g. adhered) on the foam core, on the fibreglass prior to the application of the final coat of resin, or on the final coat of resin.

In some forms, the method may further comprise locating a third layer of material between the first and second layers of material, the third layer of material being configured to magnify the image generated by the first layer of material.

Also disclosed herein is an apparatus for deterring a shark. The apparatus may comprise a first portion providing a support surface adapted to support a user therein; and a second portion locatable at the first portion, the second portion able to generate an image. In some forms, the apparatus may be a wetsuit. In some forms, the first portion may be a coloured neoprene material adapted to keep a user supported or located therein warm. In some forms, the second portion may be a reflective material (e.g. a flexible material that provides a mirror effect, metallic pain, etc.) that is disposed on the first portion. The second portion may generate an image of the surrounding environment (e.g. the ocean) to camouflage a user disposed within the apparatus from a predator (e.g. a shark) located in the surrounding environment. In applications such as surfing, the second portion may be located adjacent the user's extremities. In applications such as diving, the second portion may cover the first portion to effectively camouflage the user supported in the apparatus.

BRIEF DESCRIPTION OF THE DRAWINGS

Embodiments will now be described by way of example only, with reference to the accompanying drawings in which.

DETAILED DESCRIPTION

Numerous efforts have been made to find a method to protect humans in the water from predatory sharks. A problem with the prior methods and devices is that they rely upon interfering with the anthropomorphic projection of shark behaviour and do not address the natural hunting strategies of the shark. In contrast to the methods of the prior art, the Applicant has determined a method that does not harm or interfere with the sharks wellbeing or natural behaviour. Moreover, the Applicant has determined a method and device that uses the natural behaviour of sharks, rather than interfering with the natural behaviour of sharks, in order to deter sharks from attacking humans.

Figure 1:
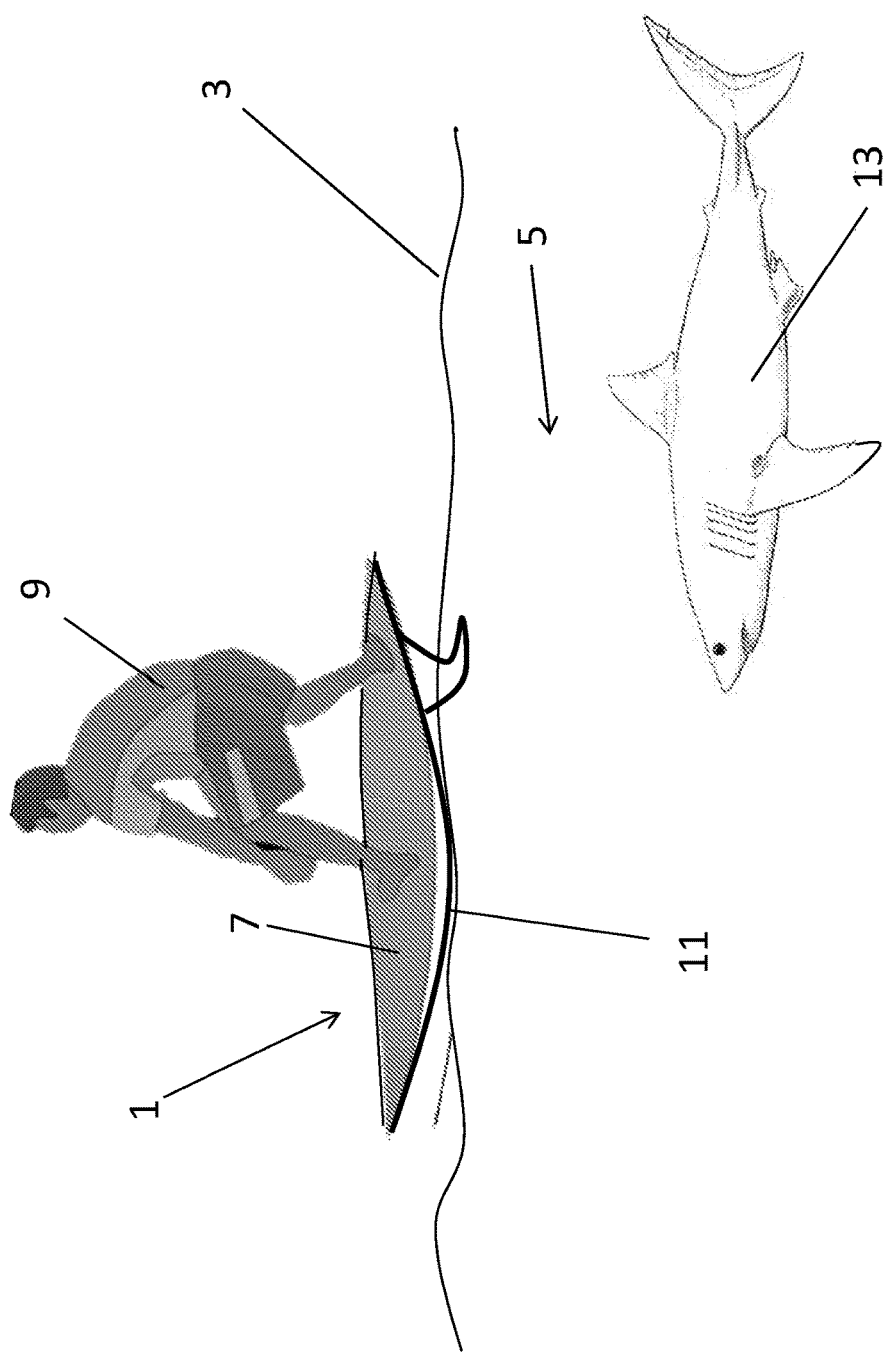
FIG. 1 shows a side view of a surfboard that includes a layer of material configured to generate an image of the surrounding environment (e.g. the ocean and shark located below the board or at a reciprocal angle to the viewer)

Referring firstly to FIG. 1, disclosed herein is an apparatus for deterring a shark. The disclosed apparatus is described herein in the context of a surfboard 1. However, in other forms, the apparatus may be any other watercraft (e.g. windsurfer, stand-up paddle board, kayak, boat, body board, wave-board, kite board, surf ski, boat or other vessel) that are able to support a user 9 on the surface 3 of a body of water 5 (e.g. ocean, river, lake or other water body).

The apparatus, in the form of a surfboard 1, comprises a first buoyant portion, in the form of a foam core 7, that provides a support surface adapted to support a user 9 thereon. The surfboard further comprises a second portion 11 locatable at the first portion. The second portion is able to generate an image. When the surfboard is located on, or below, the surface 3 of the ocean 5, the second portion, in the form of the underside of the surfboard 1, is able to generate the image. The image generated is able to camouflage the surfboard from the vision of a predator, in the form of a shark 13, located below (or at a reciprocal angle to) the surfboard. The reflected image deters the shark 13 from attacking the surfboard 1 and user 9 located thereon. In at least one embodiment, the generated image is able to both camouflage the surfboard and dynamically deter the shark 13 from attacking the surfboard 1.

An advantage of the surfboard 1 disclosed herein is that, in at least one embodiment, it is able to minimise the occurrence of attacks by utilising the shark's natural behaviour to abort an attack, thereby reducing the detrimental or harmful effects on the survival requirements of the shark. Another advantage is the reflective image may confuse the shark at the point of attack in a manner that mimics schooling fish, such as when they form a reflective wall to make the location of individual fish more difficult for a shark to determine.

In order to capture prey, a shark must first locate its item. Active foraging for food or hunting consumes considerable energy and the shark uses different senses at differing ranges in order to find food, thus minimising random searching and increase the rate of success. Low frequency vibrations have been shown to attract sharks from several kilometers away, corresponding to the noise made by struggling fish. The olfactory system is able to detect even minute traces of chemicals, such as fish oil or blood, from hundreds of meters and enables the shark to follow an odour trail to a prey source. Once within the hundred meter range, a series of fluid filled sensory canals with hair like receptors, detect changes in water movement and vibrations leading the shark closer to the prey. Within tens of meters of the prey source, sharks use a unique electro-receptive system known as the Ampullae de Lorenizini to detect the minute bioelectrical signals given off by all animals. Within approximately the ten meter range, vision is used to locate the prey item, and finally, on contact, touch and taste are utilised to confirm the prey is what the shark believed it to be. Great White Sharks, at the last moment before biting prey, will roll their eyes back into a protective socket, even when feeding on dead or unresisting prey. Other sharks have an extra eyelid know as a nictating membrane for eye protection highlighting the importance of vision to hunting success.

In summary, the order of senses typically used by a shark during an attack run is sound (range of kilometers), smell (range of hundreds of meters), bioelectrical signals (range of tens of meters), vision (range of approximately ten to one meter), and finally taste (range of approximately one meter). By generating an image, the disclosed surfboard utilises the penultimate sense of a shark that is utilised during an attack run.

Figure 2:
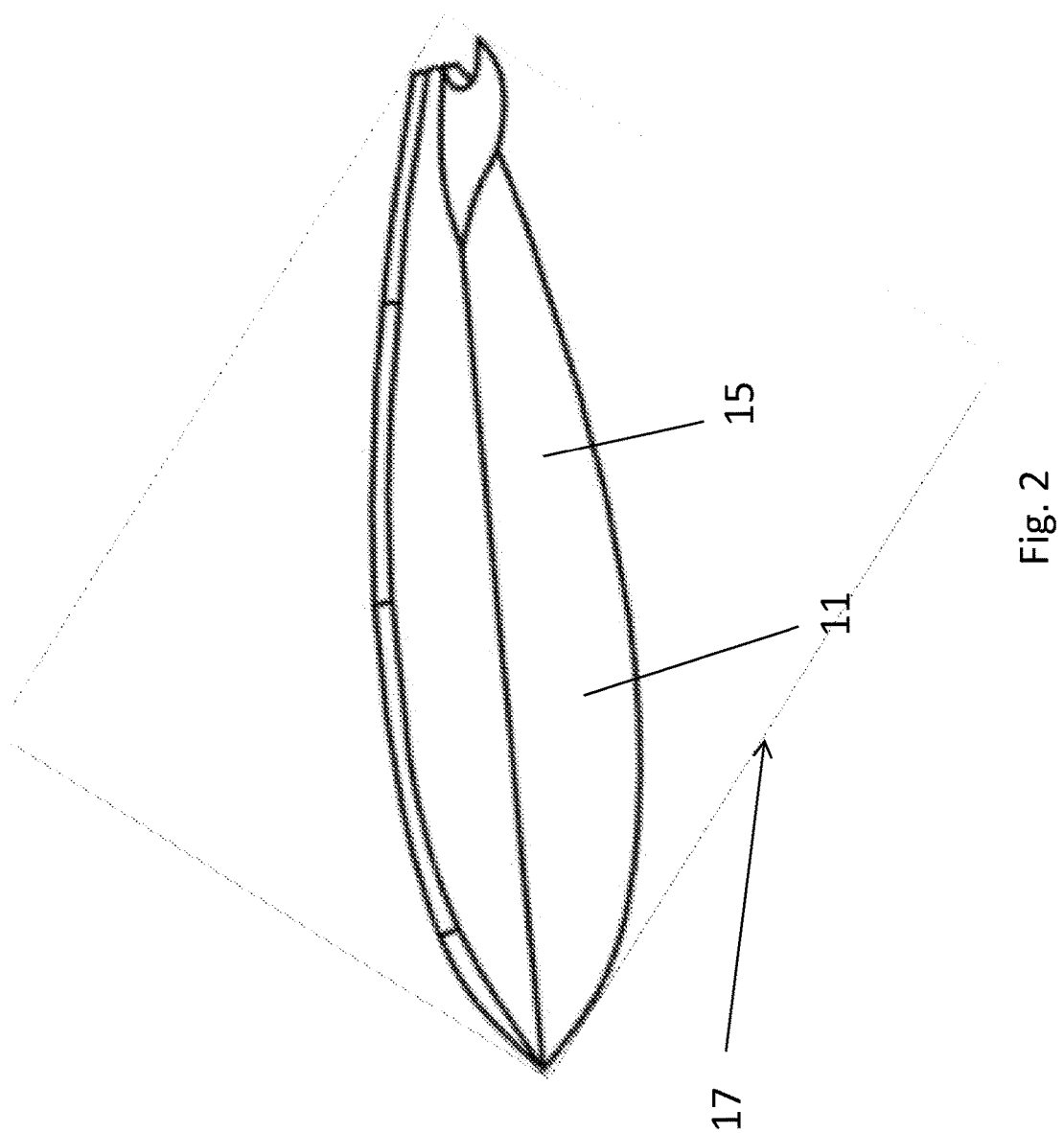
FIG. 2 shows a perspective view of the surfboard of FIG. 1.

Referring now to FIG. 2, the surfboard will be described in further detail. In one form, the second portion 11 comprises a reflective surface, in the form of a mirror 15. The mirror 15 is able to reflect the environment 17 located at a reciprocal angle to the viewer. By doing so, the reflective surface is able to camouflage the surfboard from a shark approaching the board from below or at an angle to the surfboard. The generated or reflected image is very similar to the surface of the water disposed about the surfboard. As such, during an attack run, a shark is unable to confirm or is confused as to the location of the sensed prey item and aborts the attack run. Previously, the shark may have mistaken the silhouette of a surfer on a surfboard for their more usual prey items such as a seal. If a shark is within the general vicinity of the surfer, the shark may not investigate the surfboard as a result of the board not standing out as an interesting object on the water surface.

Figure 3:
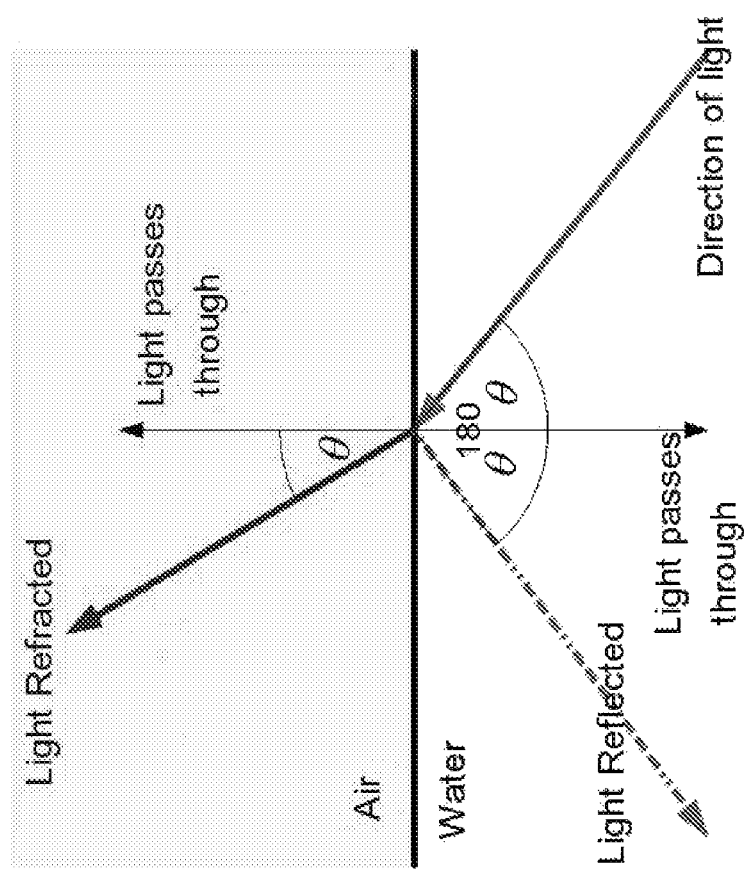
FIG. 3 shows the reflection and refraction of light through and from a water surface when viewed from within the water.

FIG. 3 shows the reflection and refraction of light through and from a water surface when viewed from within the water. When two media or substances such as air and water with different densities meet, the interface between the two will act as reflector. Photons of light strike the different molecules of the media at different rates. At an intersection between water and air, this occurs from above (i.e. looking from the air into the water) and from below (i.e. looking from the water into the air). At an angle of 90° to the water surface, light passes through the water surface such that little light is reflected. When the water surface is viewed at an acute angle, a first portion of light passes through the water surface and is refracted, while a second portion of light is reflected by the water surface. The amount of reflection depends on the angle of the light wave, stillness of the water and any impedance due to other molecules or objects in the water. In sea water, a number of salts and other ions are present as well as plankton and suspended particles that can affect the level of reflection. Movement in the water or on the surface can produce distortions in the reflection as a result of altering the angle of intersection between the light wave and the water surface. The substrate of the water also contributes with darker backgrounds creating a better reflection. For example, in fresh water, deep dark pools produce a better reflection than shallow moving water.

Figure 4:
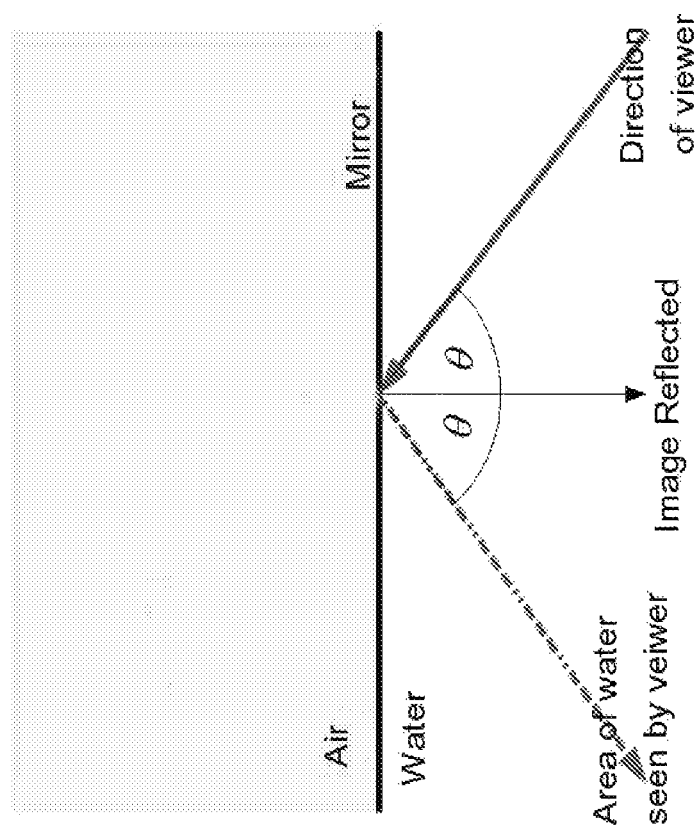
FIG. 4 shows a mirror disposed on the water surface shown in FIG. 4.

FIG. 4 shows a mirror (i.e. a reflective surface) disposed on the water surface. When viewed from directly below (i.e. at an angle of 90° to the water surface), the mirror reflects an image of what is directly in front of the mirror. When viewed from an acute angle to the water surface, the reflection generated by the mirror is at a reciprocal angle (i.e. in FIG. 4, the reflected image is of the surrounding water thus making the image indistinct from the surface of the water). This generated image is able to produce a highly effective camouflage that adapts to changing light and water conditions. In smooth still water with no salts, plankton or suspended particles, the reflection generated by the mirror is very similar to, and thus indistinguishable from, the water surface.

However, the surface of seawater (i.e. an ocean, or fresh water as in river, lake, etc.) does not generally provide a clear undistorted reflected image. A mirror positioned on the surface of seawater can generate a reflected image that is not identical to the water surface (e.g. the mirror is able to outperform the water surface and therefore be relatively more visible than the surrounding water surface from below). While the reflected image generated by the mirror is able to camouflage an object positioned above the mirror, the camouflage effect can be further enhanced. In order to match the surface and create a more effective camouflage, the quality of the reflection of the mirror can be reduced by the same amount as the reduction to the quality of the water surface caused by the seawater (or freshwater).

In clean, clear seawater with high visibility the reduction in reflected image quality may only be 10% (i.e. 90% reflective). Turbidity or movement reduces the image quality further. The reflected image quality can be termed "reflective value". Reflective values can be described in gloss units (GU) or as a % of reflected light. A non-reflective matt surface has a reflective value of 0 GU (i.e. 0% reflection). A highly reflective mirror has a reflective value of close to 250 GU (i.e. close to 100% of light reflected). In some forms, the reflective surface of the surfboard has a uniform reflective value. Depending on the environment in which the surfboard (or other watercraft) is being used, the reflective value of the reflective surface of the board can be configured to approximately match the reflective value of the water surface to camouflage the surfboard. For example, in light warm tropical water, a uniform reflective value of 70 to 90% of light reflected can be used to approximately match the reflective value of the water surface. In cold dark water, a uniform reflective value of 40 to 60% of light reflected can be used to approximately match the reflective value of the water surface. In temperate cool water, a uniform reflective value of 60 to 70% of light reflected can be used to approximately match the reflective value of the water surface. It should be noted that a white surfboard or other watercraft (e.g. kayak, boat, etc) has an approximate reflective value of between 20 and 30% (50-70 GU). This level of reflection does not generate a reflected image and therefore the object is distinguishable from below when on the water surface. It should also be noted that an aluminium boat has a reflective value of approximately 2 to 20% of light reflected (2-50 GU). Again, this level of reflection does not generate a reflected image and therefore the object is distinguishable from below when on the water surface.

The clarity or visibility of seawater and therefore the reflective value of the surface is not stable. Changes occur with light levels, weather conditions, seasonal growth of algae, geographic location, depth, bottom composition, sun angle and other factors. The changing orientation of the viewer also affects the reflective value. A reflective surface of an object on or below the water surface having a specific reflective value, for example 80% reflection, would at times match the reflective value of the water surface perfectly, thus making the object completely indistinguishable (i.e. highly camouflaged) from below the water surface. However, at other times (i.e. when a change in environment occurs) the reflected image would vary from the image reflected by the surrounding water surface, thus making the object relatively more distinguishable from below. Reflective levels within 5% of each other are very difficult to distinguish by the human eye and an object of 80% reflectiveness can be very effective camouflage in water of 75% to 85% reflectiveness. Through experimentation, it has also been determined that a reflective surface having a variation in reflective values (i.e. a reflective surface with a non-uniform reflective value) is able to further enhance the camouflage effect. This will now be described in further detail.

Figure 5:
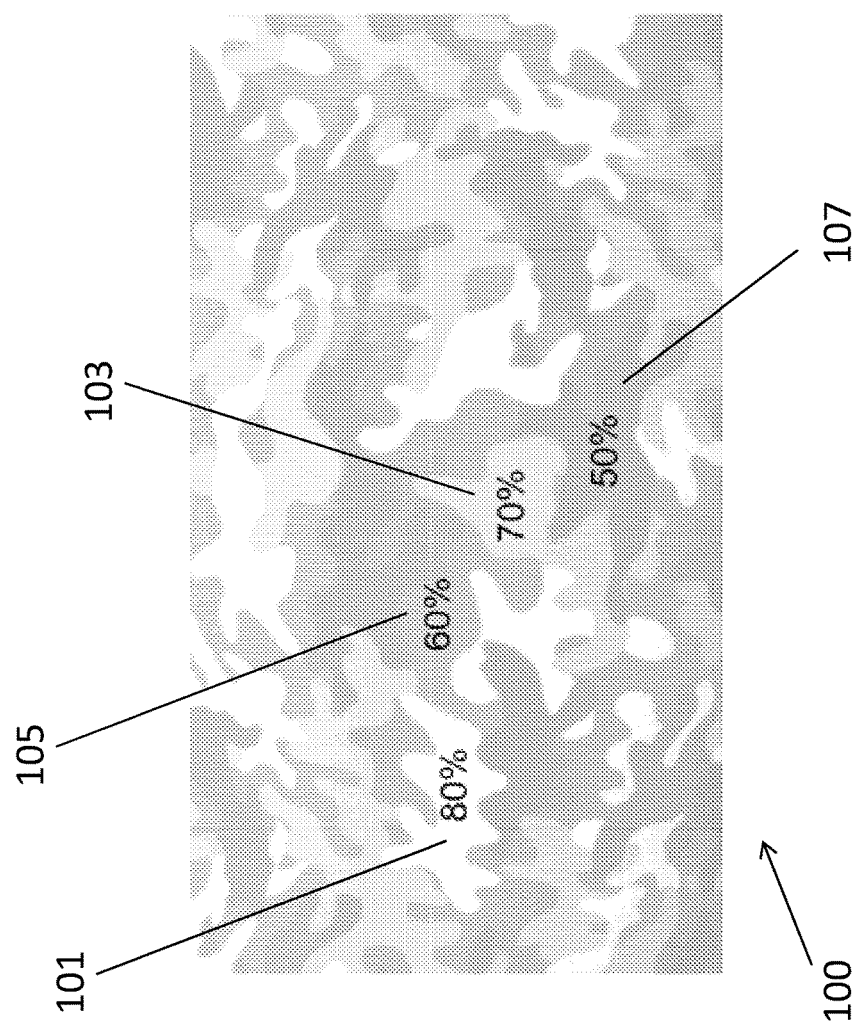
FIG. 5 shows a reflective surface having a non-uniform reflective value.

A reflective surface with a non-uniform reflective value is able to overcome the variation in clarity or visibility of seawater and therefore enhance the camouflage effect. Increments in reflective value of approximately 10% are highly effective. This is shown in FIG. 5. A reflective surface 100 has reflective portions of 80% (101), 70% (103), 60% (105) and 50% of light reflected (107) reflective value should have at least one portion that corresponds to the reflective value of the water surface very closely, thus making it indistinguishable, while the other reflective portions should still be similar to the reflective value of the surrounding water surface and assist in camouflaging the surfboard. To make the shape of the object to which the reflective surface is incorporated less apparent from underneath, the border between reflective portions having different reflective values can consist of soft curves of an irregular shape with finger like projections (as shown in FIG. 5). The size of the differing reflective areas is also able to increase or decrease the camouflage effect. Through experimentation, it has also been determined that irregular soft shapes of approximately 150-200 mm in length and width provide the most effective result. In addition, the reflective portions can be randomly distributed (also shown in FIG. 5) and of approximately equal areas. In one embodiment, four reflective portions, each having a varying reflective value, are randomly distributed on the reflective surface. Each reflective portion covers approximately 25% of the total area of the reflective surface. As will be evident to the skilled addressee, any number of reflective portions and any incremental step in reflective value between the portions can provide a reflective surface having a useful camouflage affect. For example, a plurality of distinct reflective portions ranging from a reflective value of 40% to 100% (i.e. in incremental steps of anything from 1% to 60%) can be incorporated into the reflective surface to provide the camouflage effect. Also, the proportion of reflective portions having relatively high reflective levels and relatively low reflective levels can be varied. For example, for tropical waters where the water is very clear and light, a greater proportion of relatively high reflective values can be disposed on the reflective surface of the surfboard. In water having relatively less visibility, a greater proportion of relatively low reflective values can be disposed on the reflective surface of the surfboard.

Figure 6:
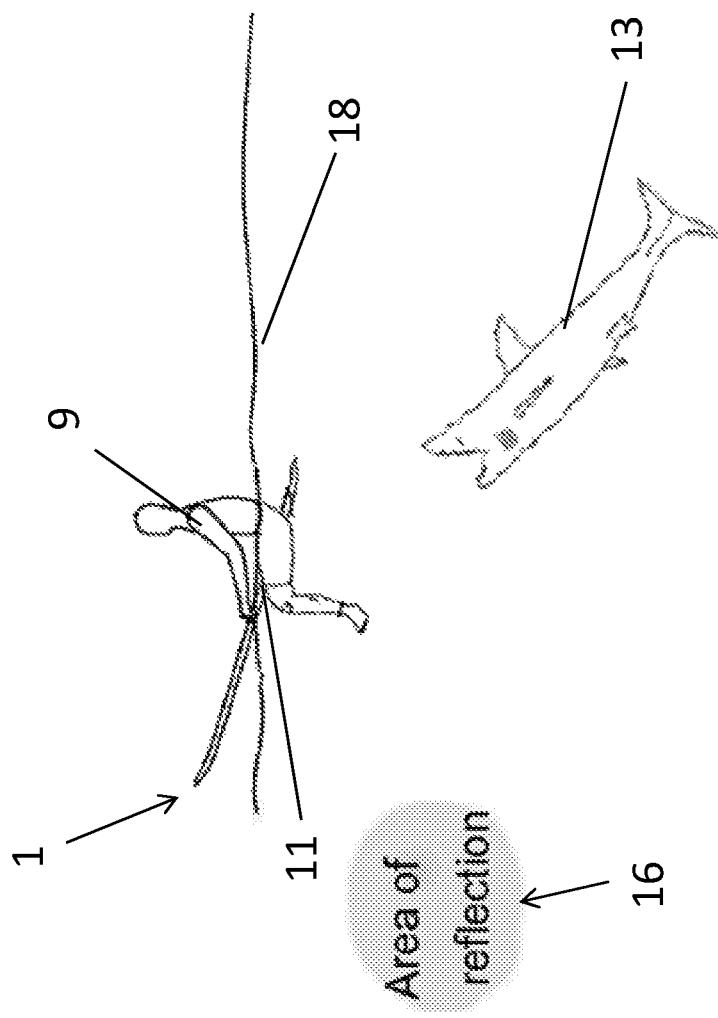
FIG. 6 shows another side view of the surfboard in use and the approximate area of reflection according to a sharks angle of approach.

As shown in FIG. 6, at a 45° angle of approach, a shark 13 sees a reflection 16 of the water at 90° of its approaching angle. The image generated by the mirror 11 located at the underside of the surfboard is of the surrounding water 16 and acts as highly effective camouflage. The surface 18 of the water when viewed from underneath also acts as a mirror with distortions due to the movement of the water is matched by the mirror film. The reflected image is dynamic, in that the generated image can continually change and adapt to match the surrounding environment. For example, if the water level is shallow and the surrounding environment is clear and light, an image of a sand bottom can be generated. Where the water level is deep and the surrounding environment is coloured blue, a blue image can be generated to match the surrounding environment. In each case, the reflected image is similar to the image reflected by the surrounding water surface. The dynamically generated image is also able to match the light levels of the surrounding environment. Thus, the generate image is able to make the shape of the surfboard indistinct from a submerged position below the surfboard.

If the camouflage is ineffective from deterring the shark from aborting an attack run, the generated image is able to further utilise the shark's sense of vision to provide a further attack deterrent.

Very few animals have both the size and ability to harm a large predatory shark. The only other marine animal that has been known to attack a large predatory shark is the Orca, or killer whale. These marine mammals operate in a pack and have a very strong social structure that ensures protection of their young, which a shark, if given the opportunity, will prey upon. In addition, both species may be in competition for the same food source further increasing negative interactions. Reports of Orcas attacking sharks, and in some cases killing large adult Great White Sharks, while not common, have occurred in locations where both species are present. Sharks have been known to evacuate an area immediately on the arrival of an Orca pod and stay absent from highly used areas for several days to weeks. Using the black and white patterning of an Orca on wetsuits and vessels can be effective at avoiding interactions. However, Orcas are not located in all marine habitats and many shark species are not familiar with Orcas. Therefore, there is little chance that such sharks would react in a similar way, thereby limiting the effectiveness of the method. A disadvantage of this method is that the pattern may give the impression of a small or juvenile Orca with no adults close by and encourage closer investigation by sharks.

Importantly, smaller species of sharks are dominated by larger species and will defer by keeping away, leaving the area completely, or if at a common food source, waiting for the larger species to finish before attempting to feed. This is particularly apparent with Great White Sharks. Grey Nurse sharks inhabit aggregation gutters in high numbers with little interspecies aggression or competition. When a Great White Shark is present, Grey Nurses immediately evacuate the gutter and disperse. On beaches where Great White Sharks are common and Blue sharks are occasionally present, several instances of Blue sharks being chased onto the beach by larger Great White Sharks have been reported. Aerial observations on open beaches have witnessed Great Whites swimming together at a uniform distance (approximately 20 m) but no reports or sighting have occurred with other species of shark nearby. Tiger, White and most other sharks, if the opportunity arises, will feed on whale carcasses. Tiger sharks will defer to Whites in most situations because, in most cases, Great White Sharks are larger and more dominate. Whale carcasses also provide evidence of interspecies interactions. If no other sharks are present, the first to arrive will begin to feed. If multiple sharks are present, the largest feeds first with other sharks wait their turn. Once the dominate individual has fed, others may join in adhering to the behavioural signals indicating that they will not be subject to an aggressive act. Great White Sharks of a similar or equal size, if dominance is in question, will swim in tandem parallel to each other to access which shark is the larger. Tail slapping on the surface, mouth actions and body arching are signs of an escalation of aggression and, if one individual does not give way, contact can take place. As the teeth of sharks can cause considerable damage all possible steps are taken to avoid contact. Great White Sharks have been known to inflict severe wounds to their own and other species if dominance is in question and also cannibalize smaller individuals. Large sharks are subject to defensive bites by smaller sharks, which may affect their survival. Therefore, sharks do not take risks where self-injury is possible or likely and rely on display to assert their dominance.

Therefore, in situations where the camouflage is ineffective from deterring the shark from aborting an attack run, the generated or reflected image will be of the shark itself, thus provided another deterrent for the approaching shark. In one embodiment, the mirror on the underside of the surfboard is about to generate an image of an approaching shark that will appear to be the same size as the approaching shark. Whilst this can be effective, in another embodiment, the generated image is able to be magnified to further encourage an approaching shark from attacking the surfboard. In this form, the second portion of the surfboard comprises a magnifier for magnifying the generated image.

Figure 7:
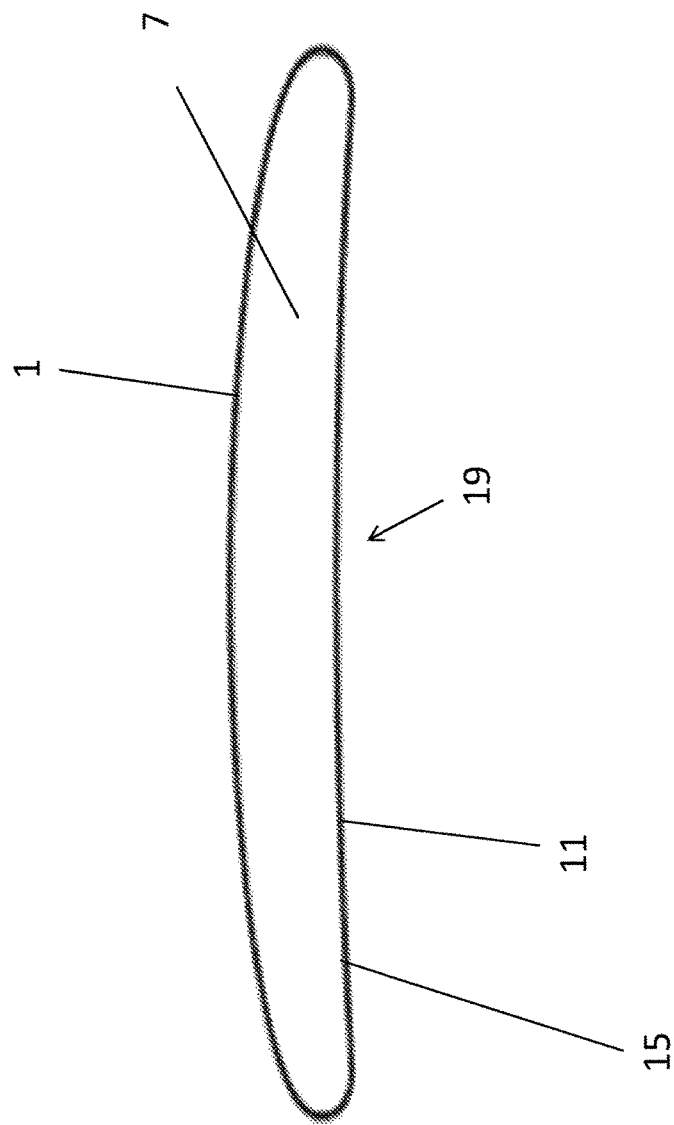
FIG. 7 shows a cross-sectional view through a surfboard having a concave bottom surface.
Figure 8:
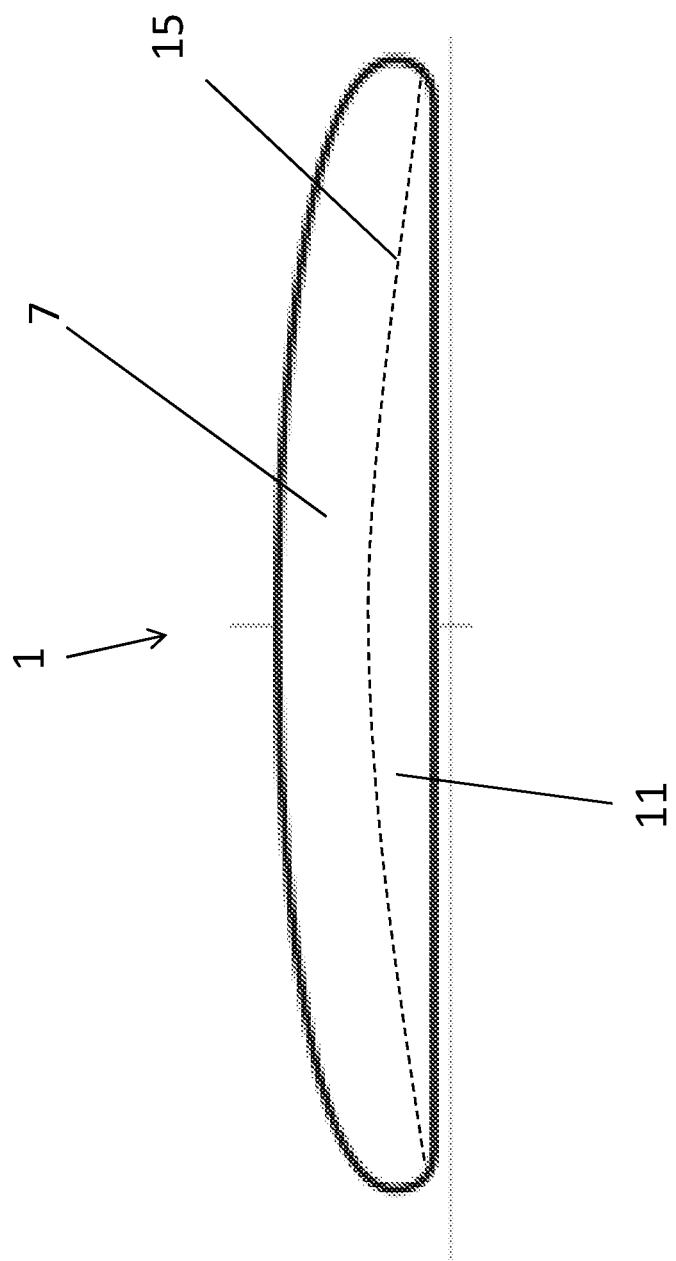
FIG. 8 shows a cross-sectional view through a surfboard having a flat bottom surface and adapted to have a reflective layer of material located within surfboard.

The shape of the underside of the surfboard 1 is able to provide the magnifying effect. As shown in FIG. 7, some surfboards have a concave 19 underside. Advantageously, concave mirrors can magnify a reflected image. The depth of the curve needed for a concave mirror with a focal length of two meters is approximately 5-10 mm. As shown in FIG. 8, where the surfboard does not have a concave underside, foam 7 can be removed from the underside of the board to install the concave shaped mirror 15 within the surfboard 1. It should be noted that in many situations, this method of installation would not be preferred as it may compromise the strength to of the surfboard (e.g. by effectively creating a void in the board) and may also affect the weight distribution of the board (e.g. if the void is filled with resin). Again, if the board already has a slight concave shape, the reflected image could be magnified without removal of foam from the surfboard.

Figure 9:
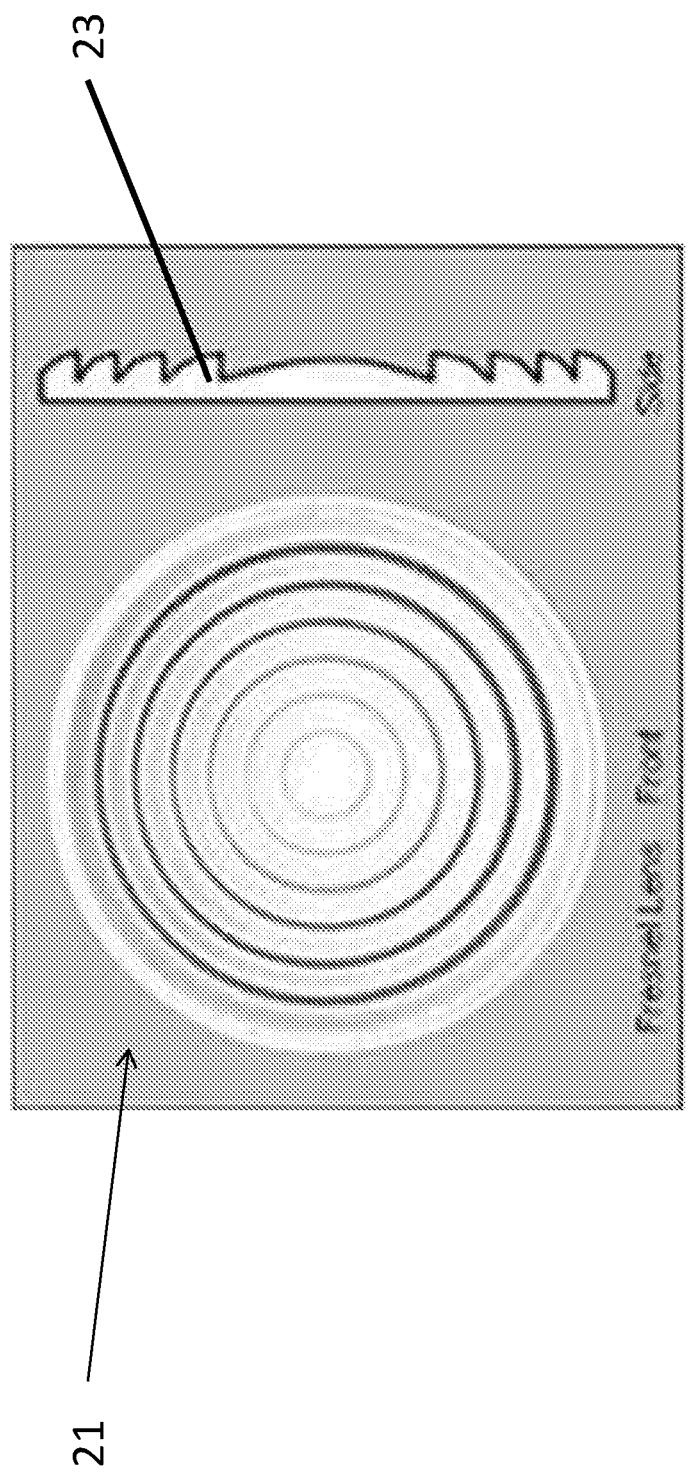
FIG. 9 shows a magnifying layer in the form of a Fresnel Lens.

In one form, the second portion comprises a magnifier, in the form of a Fresnel Lens 21, for magnifying the generated image. The Fresnel Lens can be used in conjunction with, or as an alternate to, a concave underside surface. As shown in FIG. 9, the Fresnel Lens 21 is a thin (e.g. approximately 1 mm thick) transparent sheet that includes a series of ridges 23 in a transparent lens that redirect light rays to magnify the generated and reflected image. In addition to the Fresnel Lens 21 film being able to mimic the effect of a 3D concave mirror to magnify the generated and reflected image, the Fresnel Lens can also expand the angle of the reflected image. In one embodiment, a shark is able to see a magnified and reflected image of itself when approaching the underside of the surfboard from an angle of attack between 45° and 90°. Therefore, the approaching shark will see an image of a larger shark of its own species approaching at speed, further encouraging the approaching shark to abort the attack run if the camouflage is unsuccessful.

Figure 10:
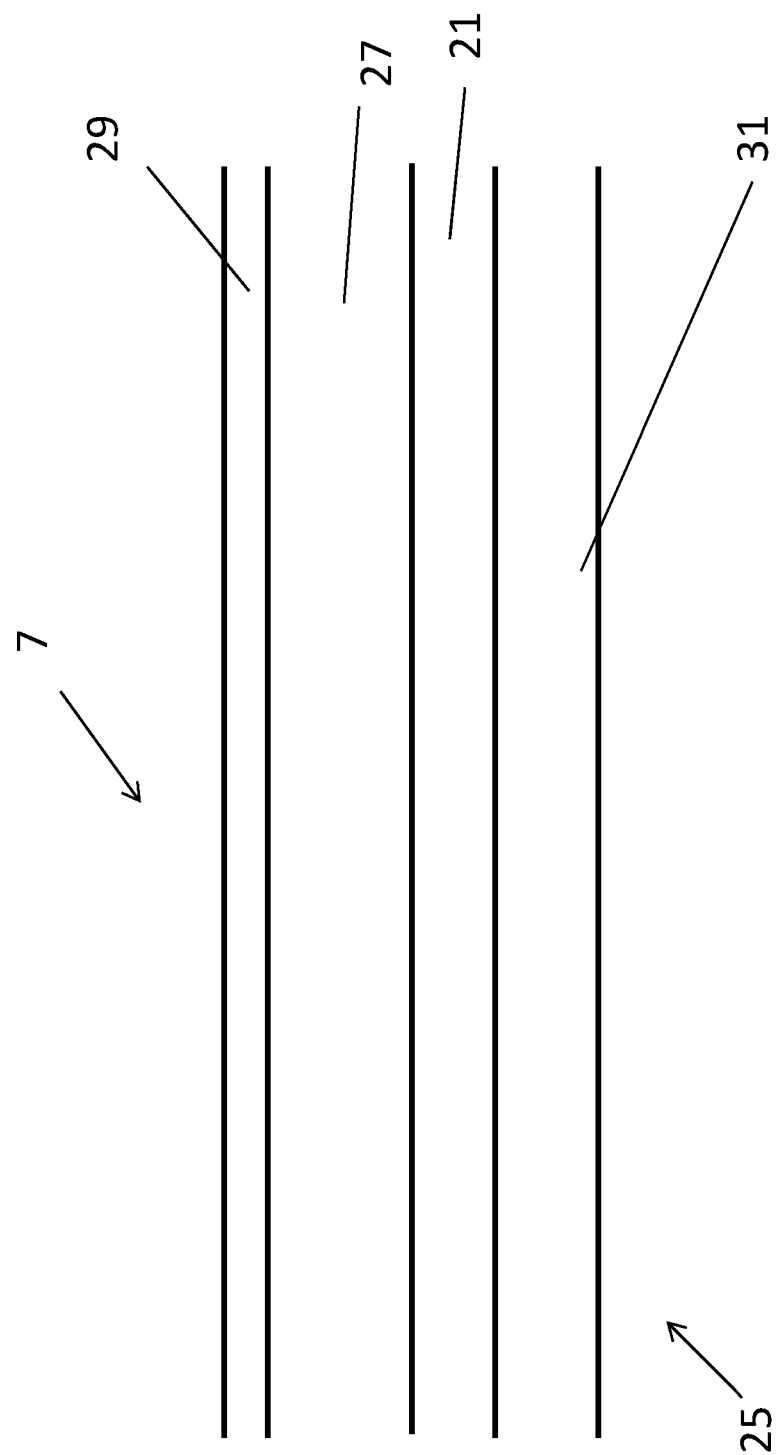
FIG. 10 shows a cross-sectional view through the multiple layers of the second portion.

Referring now to FIG. 10, the second portion, in the form of a reflective sheet 25, is in the form of a multiple layers that can be applied to a pre-fabricated surfboard. Surfboards typically have a foam core 7 that is encased with a protective layer of fibreglass. In one form, the reflective sheet can be connected (e.g. adhered, glued, stuck) to the underside of a pre-fabricated surfboard. In this form, the sheet 25 is flexible, in the form of a flexible mirror film, to allow the sheet 25 to be shaped to match the underside of the surfboard. In this way, pre-fabricated surfboards can be retrofitted to include the reflective sheet 25 that is able to both camouflage the surfboard and generate an image of an approaching shark. In this form, the second portion includes a mirror film 27 with a layer of adhesive 29 that enables the reflective layer to be fastened to the underside of the surfboard. In one form, the reflective sheet is a metallised weatherable acrylic film having a reflectance of >90% and covered with a clear protective layer. In this form, the reflective sheet is approximately 0.1 mm in thickness and of negligible weight relative to the surfboard. The reflective sheet 25 also includes a magnifying layer 21 (e.g. a film Fresnel Lens).

Figure 11A:
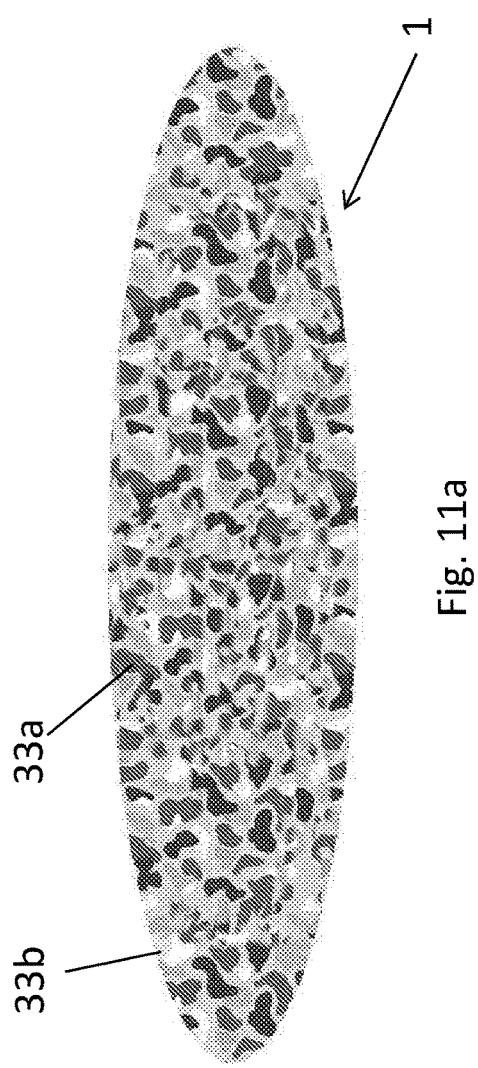
FIGS. 11a-b show alternate embodiments of the surfboard including a reflective camouflaged pattern surface (a) and both reflective camouflaged pattern surface and a portion of non-camouflaged pattern reflective surface (b)
Figure 11B:
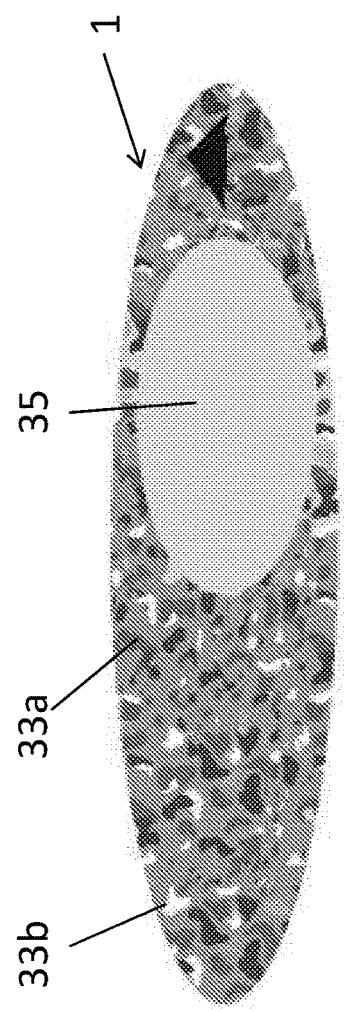

The level of reflectance of the mirror film can be selected in dependence on the environment where the surfboard is most likely to be used. For example, clear coated mirror film having a reflective level over 90% can be used for tropical clear water. In another form, the mirror film can be diffused to reduce the level of reflectance, enabling the surfboard to be more effectively camouflaged in darker water. In one embodiment, a plurality of reflective surfaces having differing levels of reflectance can be applied to the underside of the board. As shown in FIG. 11a, the plurality of reflective surfaces 33a, 33b can be applied in a camouflaged pattern to the underside of the surfboard 1 to enable the surfboard to be affectively camouflaged in different environments and to be visually appealing. This will be described in further detail below. As shown in FIG. 11b, a combination of camouflaged patterns of reflective surfaces 33a, 33b and a clear magnified or non-magnified mirror 35 can be applied to the underside of the surfboard 1.

Surfers typically sit towards the rear of a surfboard when waiting for a wave. In one form, the reflective layer 25 can be stuck to only the central and rear portions (i.e. the towards the tail) of the board to camouflage the tail. However, this will not camouflage the front portion (i.e. the nose) of the board. In another form, the reflective layer 25 is stuck to the entire underside of the surfboard 1. The shape of the reflective layer can be configured to allow for the surfboard fins to protrude through the reflective layer. In another form, the reflective layer can also be applied to the surfboard fins, leg rope and/or the rails of the surfboard to further camouflage the surfboard. In one embodiment, following adhering the reflective layer to the surfboard, a protective layer 31 (e.g. an additional thin layer of resin) can be added to the underside of the surfboard to protect the reflective layer.

As previously described, surfboards commonly have a foam core that is encased with a protective layer of fibreglass. Surfboard shapers can either hand shape the foam blank, using a planer and surform to cut away layers of foam to form desired surfboard shape, or they can use a CNC router/3D printer to machine form the desired surfboard shape. A layer of fibre reinforcement (e.g. layers of fibreglass, carbon fibre) can be applied to the shaped foam, along with a thermosetting plastic such as polyester resin or epoxy, to form a protective layer around the surfboard.

Method of Manufacture

In one form, the shaped foam can be painted using a metallic paint. The shaped foam blank can then have fibreglass and clear resin applied to produce a reflective surfboard. In another form, the hardened fibreglass can be painted using reflective paint. If required, a further magnifying and/or protective clear coat of resin can be applied to protect the painted resin layer. In another form, the resin can be tinted using a metallic tint. That is able to generate an image.

In some forms the apparatus can be incorporated during the manufacturing process of the surfboard as an internal layer or attached on the bottom ventral surface after completion. In at least one embodiment, the area covered can include the complete underside of the board continuing over the rail and onto the deck to ensure the rail is covered with the reflective method used. In some forms the fins or any other inclusions, projections or appliances attached to the underside of the board would also be covered. In other forms, the fins or any other inclusions, projections or appliances could be made with a translucent, transparent or neutral grey material.

Figure 12:
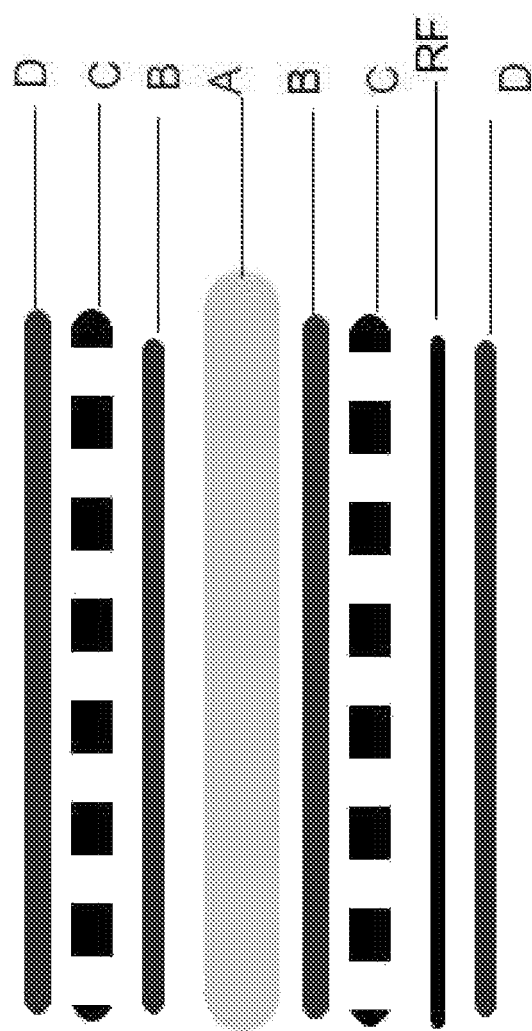
FIG. 12 shows an embodiment whereby a reflective film is disposed within the fibreglass and resin structure of the surfboard.

As shown in FIG. 12, surfboards often consist of a foam core A that is encased in fibreglass B/C to provide strength, isolate the foam core from water and protect the foam core from damage. A base resin B mixes with the fibreglass C to bond the fibreglass to the foam A. A top 'wax' coat of resin D forms a sealed bond with the hardened fibreglass B/C. Additional layers, of resin, fibreglass and other items for strengthening can sometimes included.

Occasionally, artwork logos or other items are disposed between the fibreglass and top coat or between the foam and fibreglass during manufacture.

During manufacture, a reflective film RF can be included between the fibreglass B/C and the top wax coat of resin D. In alternate embodiments, the reflective film can be positioned between the foam A and the fibreglass B/C or between the fibreglass B/C and another layer of fibreglass (not shown). In some embodiments, the reflective film is formed from a metallised film that is used in window applications, or high grade printed material having a reflective level of 90-100%. To create a reduced reflective level on the reflective layer, a pattern can be printed onto the reflective layer. For example, mixtures of varnishes and inks can be printed on to a metallised film to create the pattern shown in FIG. 5. In some forms, the varnishes and inks are resistant to derogation by normal sunlight and ultra violet light.

Table 1 (below) shows the levels of varnish, black ink and white ink used to create different levels of reflected light on a reflective film.

TABLE 1

Levels of varnish, black ink and white ink used to create different levels of reflected light on a reflective film

| Levels of Varnish, Black and White Inks | Reflective % |
|---|---|
| V0B0W0 | 94.00% |
| V8B2W2 | 94.00% |
| V15B3W3 | 90.16% |
| V10B5W5 | 80.33% |
| V20B5W5 | 75.41% |
| V30B5W5 | 70.49% |
| V40B5W5 | 65.57% |
| V50B5W5 | 60.66% |
| V60B5W5 | 55.74% |
| V40610W10 | 28.69% |

In some forms, the film used is porous to allow the top wax coat of resin to bond with the fibreglass. In some forms, the weight of the film is negligible relative to the weight of the surfboard (e.g. 50 to 250 grams), or other object, to which it is incorporated/attached. In some forms, the reflective film increases the tensile strength of the surfboard, or other object, to which it is incorporated/attached.

In some forms, the metallised film used is impervious to resin. In order to enable such a reflective film to be disposed between the fibreglass and the top wax coat, or between the foam and the fiberglass during manufacture, bonding perforations can be included in the film at intervals to allow for the resin to flow though the film. A plurality of small apertures (e.g. 0.1 mm to 3 mm in diameter) can generate a plurality of resin pillars that lock the layers together. The required number of perforations and aperture size is dependent on the type of resin used and the flow rate/setting time of the resin. In one form, perforations (e.g. holes in the reflective film) are placed every 2 mm to provide 500 holes per 1000 mm². In some forms, perforations can be used (e.g. in lieu of printing) to provide varying levels of reflective value. Table 2 (below) shows the approximate reflective value for differing aperture size perforations.

TABLE 2

Approximate reflective value for reflective films having differing aperture size perforations

| Holes | Area of Hole mm2 | Total area mm2 | Reflective Area mm2 | Reflective % | Diameter of hole mm |
|---|---|---|---|---|---|
| 500 | 0.1 | 50 | 950 | 95% | 0.36 |
| 500 | 0.2 | 100 | 900 | 90% | 0.50 |
| 500 | 0.3 | 150 | 850 | 85% | 0.62 |
| 500 | 0.4 | 200 | 800 | 80% | 0.71 |
| 500 | 0.5 | 250 | 750 | 75% | 0.80 |
| 500 | 0.6 | 300 | 700 | 70% | 0.87 |
| 500 | 0.7 | 350 | 650 | 65% | 0.94 |
| 500 | 0.8 | 400 | 600 | 60% | 1.01 |
| 500 | 0.9 | 450 | 550 | 55% | 1.07 |
| 500 | 1 | 500 | 500 | 50% | 1.13 |

For example, the reflective pattern shown in FIG. 5 can be formed with a perforated film having a uniform base layer of 500 holes per 1000 mm² with holes of 0.2 mm diameter (90% reflective), 0.71 mm (80%), 0.87 mm (70%) and 1.01 mm (60%). The holes reduce the overall area of reflective surface and thereby reduce the reflective % of the irregular shapes. Allowing for a reduction in reflectance value by the resin top coat of 10%, reflection values of 80%, 70%, 60% and 50% can be achieved. Each level comprises an approximately equal proportion of the underside of the surfboard (e.g. 20-30%) of the total surface area of reflective film.

In another form, using a uniform perforation aperture size can be used to create the pattern shown in FIG. 5.

TABLE 3

Approximate number of perforations and the corresponding reflective % for perforations having a diameter of 0.5 mm

| Holes | Area of Hole mm2 | Total area mm2 | Reflective Area mm2 | Reflective % | Diameter of hole mm |
|---|---|---|---|---|---|
| 200 | 0.2 | 40 | 960 | 96% | 0.50 |
| 400 | 0.2 | 80 | 920 | 92% | 0.50 |
| 600 | 0.2 | 120 | 880 | 88% | 0.50 |
| 800 | 0.2 | 160 | 840 | 84% | 0.50 |
| 1000 | 0.2 | 200 | 800 | 80% | 0.50 |
| 1200 | 0.2 | 240 | 760 | 76% | 0.50 |
| 1400 | 0.2 | 280 | 720 | 72% | 0.50 |
| 1600 | 0.2 | 320 | 680 | 68% | 0.50 |
| 1800 | 0.2 | 360 | 640 | 64% | 0.50 |
| 2000 | 0.2 | 400 | 600 | 60% | 0.50 |

TABLE 4

Approximate number of perforations and the corresponding reflective % for perforations having a diameter of 0.8 mm

| Holes | Area of Hole mm2 | Total area mm2 | Reflective Area mm2 | Reflective % | Diameter of hole mm |
|---|---|---|---|---|---|
| 100 | 0.5 | 50 | 950 | 95% | 0.80 |
| 200 | 0.5 | 100 | 900 | 90% | 0.80 |
| 300 | 0.5 | 150 | 850 | 85% | 0.80 |
| 400 | 0.5 | 200 | 800 | 80% | 0.80 |
| 500 | 0.5 | 250 | 750 | 75% | 0.80 |
| 600 | 0.5 | 300 | 700 | 70% | 0.80 |
| 700 | 0.5 | 350 | 650 | 65% | 0.80 |
| 800 | 0.5 | 400 | 600 | 60% | 0.80 |
| 900 | 0.5 | 450 | 550 | 55% | 0.80 |
| 1000 | 0.5 | 500 | 500 | 50% | 0.80 |

TABLE 5

Approximate number of perforations and the corresponding reflective % for perforations having a diameter of 1 mm

| Holes | Area of Hole mm2 | Total area mm2 | Reflective Area mm2 | Reflective % | Diameter of hole mm |
|---|---|---|---|---|---|
| 100 | 0.8 | 80 | 920 | 92% | 1.00 |
| 200 | 0.8 | 160 | 840 | 84% | 1.00 |
| 300 | 0.8 | 240 | 760 | 76% | 1.00 |
| 400 | 0.8 | 320 | 680 | 68% | 1.00 |
| 500 | 0.8 | 400 | 600 | 60% | 1.00 |
| 600 | 0.8 | 480 | 520 | 52% | 1.00 |
| 700 | 0.8 | 560 | 440 | 44% | 1.00 |
| 800 | 0.8 | 640 | 360 | 36% | 1.00 |
| 900 | 0.8 | 720 | 280 | 28% | 1.00 |
| 1000 | 0.8 | 800 | 200 | 20% | 1.00 |

Tables 3-5 show the number of perforations and corresponding reflective % for perforations having a diameter of 0.5, 0.8 and 1 mm. For example the pattern of FIG. 5 could be made with a perforated film with a hole size of 0.5 mm diameter with 600 holes (88% reflective), 1000 holes (80%), 1400 holes (72%) and 2000 holes (60%). The increased number of holes reduces the overall area of reflective surface and thereby reduces the reflective % of the irregular shapes. Allowing for a reduction in the reflective value by the resin top coat of approximately 10%, reflective values of approximately 80%, 70%, 60% and 50% can be achieved.

It should be noted that commercially available perforated films are described by using the amount of remaining materiel to the amount or percentage of materiel removed due to the holes. Commonly used perforated materials are 60/40 (i.e. 40% of the material is removed) and 70/30 (i.e. 30% of the material is removed). The main application such perforated films is for see-through or one way signage on windows (e.g. on buses) where, from the outside, the film appears solid, but from the inside a person my see through the material. It has been determined from experimentation that a 70/30 perforated material is suitable to produce a reflective surface that is able to camouflage a surfboard from below. This material can then be further manipulated if required to vary the reflective level of the board surface.

In another form, variations in reflective level can be produced by using different methods of etching. For example, a highly reflective film (e.g. 90-95% reflective level) either in solid or perforated forms can be used in combination with a plurality of different etching methods, whereby each method may cause a different reduction in reflectance of the reflective film. Chemical methods using acids of differing concentrations can be applied for different time increments to reduce the reflective value of the portion of the reflective film. Physical methods using sand, grit, salt or other abrasive mediums can be fired at the film at varying propulsion speeds, concentrations or particle sizes to reduce the reflective value of the portion of the reflective film. Abrasive papers can be applied mechanically by belt, rotation or other means in varied speeds, concentrations or particle sizes to reduce the reflective value of the portion of the reflective film. The etching method used can be configured to deliberately impart refractivity, including deliberately imparting differential refractivity across the material surface.

In another form, variations in reflective level can be produced by using different methods of embossing whereby a pattern is pressed into the base material. For example, a highly reflective film (e.g. 90-95% reflective level) either in solid or perforated forms can be used in combination with a plurality of different embossing methods, whereby each method is applied at a different level in the material to cause a different reduction in reflectance of the reflective film. A variation in the pattern used, for example, may include different sized dots, crosses or other shapes that can be pressed into the base material of reflective film to reduce the reflective value of the embossed portion of the reflective film. A combination of dots, crosses or other shapes can be pressed into the base material of reflective film to reduce the reflective value of the embossed portion of the reflective film. A variation in the force used to imprint the pattern of different sized dots, crosses or other shapes can be applied to the base material of reflective the film to reduce the reflective value of the embossed portion of the reflective film. The embossing method used can be configured to deliberately impart refractivity, including deliberately imparting differential refractivity across the material surface.

In another form, variations in reflective level can be produced by using different resins. For example, a highly reflective film (e.g. 90-95% reflective level) either in solid or surface treated versions can be used in combination with a plurality of different resin coats, whereby each resin causes a different reduction in reflectance of the reflective film disposed below. Coloured tints (e.g. a grey tint) of varying levels can be used to reduce the reflective value of the portion of the reflective film disposed below. Examples of two types of resins (STC and SP resin) with the addition of grey tint are shown in Table 6, along with the corresponding reduction of reflective film disposed below.

TABLE 6

Variation in reflective value of a reflective film having a reflective value of 94% with two types (SP and STC) of clear (no grey) and tinted (+ level of grey) disposed over the top.

| Resin type over 94% Film | Reflective % |
| --- | --- |
| STC Resin over 94% | 88.00% |
| STC Resin over 94% + 1 grey | 84.84% |
| STC Resin over 94% + 2 grey | 72.95% |
| STC Resin over 94% + 3 grey | 67.62% |
| STC Resin over 94% + 4 grey | 57.38% |
| SP Resin over 94% | 68.44% |
| SP Resin over 94% + 1 grey | 59.43% |
| SP Resin over 94% + 2 grey | 55.33% |

Figure 13:
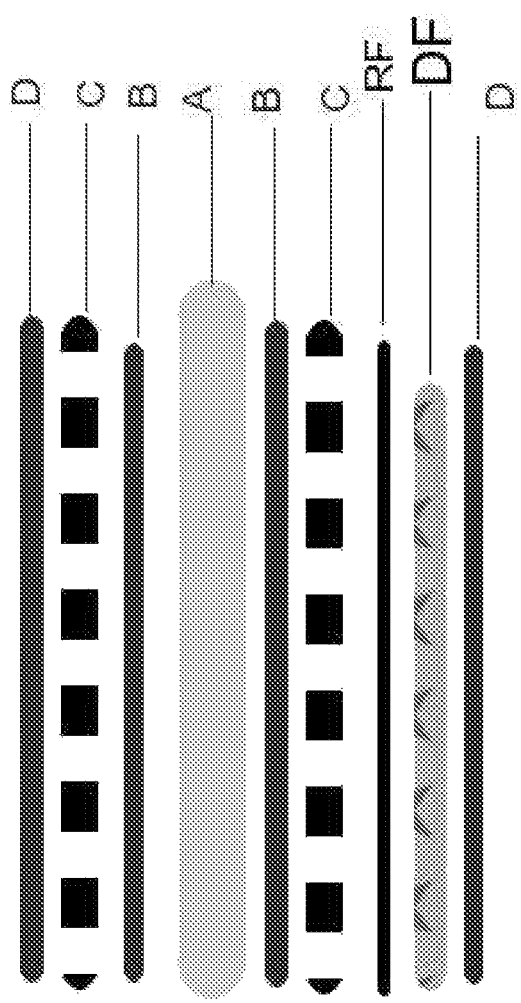
FIG. 13 shows an embodiment whereby a reflective film and diffusion layer are disposed within the fibreglass and resin structure of the surfboard.

In one form, a diffusing layer of material can be positioned between the top coat of resin and the reflective material incorporated into the surfboard. This is shown in FIG. 13, whereby the diffusing material layer DF is positioned between the top coat of resin D and the reflective film RF, which is positioned above the fibreglass B/C and foam core A. In one form, the diffusing material layer DF can include bonding perforations. It should be noted that the resin (i.e. transparent outer surface) of a surfboard can act as a diffusing layer. Additionally, the additional diffusing layer or transparent resin layer can be configured to deliberately impart refractivity, including deliberately imparting differential refractivity across the surface.

Figure 14:
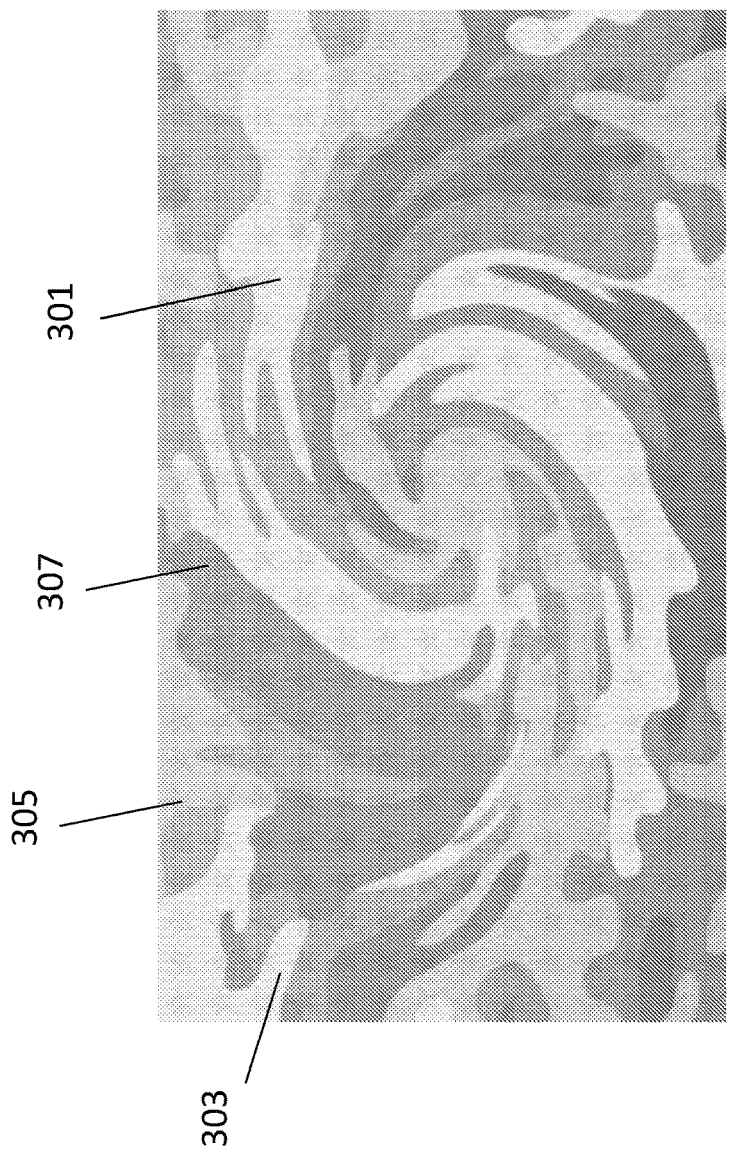
FIG. 14 shows an embodiment whereby reflective particles are incorporated within resin.

In another form, reflective material can be incorporated in the top coat of resin to create the reflective surface. In this form, a reflective film layer is not required. Highly reflective particles, micro spheres or pieces of reflective film of over 90% reflectance can be added to the top coat resin and evenly mixed. The quantity or properties of the reflective particles can be varied to increase or reduce the reflective value of the resin into which the reflective particles are mixed. FIG. 14 shows four different resins (301, 303, 305, 307) having varied quantities of reflective particles (301 having the highest quantity, 307 having the lowest quantity) that together form a reflective surface of a surfboard. In another form, highly reflective particles or micro spheres or pieces of reflective film of over 90% reflectance are incorporated within the fibreglass prior to the application of the resin top coat by sprinkling the particles onto the fibreglass before or after the resin coat is applied.

In some forms, highly reflective metallic or mirror effect paint are applied (e.g. by brush or by a compressed air powered paint gun) to the fibreglass and resin layer prior to the application of the top coat resin or between a two top coat resin layers. The paint has a high reflective value (e.g. of 80 to 90%). If required, reflective paints having varied reflective values can be used to generate a reflective surface having a non-uniform reflective value. The paint can be applied manually (e.g. by hand) or the application of paint can be automated. Spray templates/patterns can be used (e.g. randomly or in a sequence) to mask certain areas and thereby provide for a patterned spray effect.

In some forms, a reflective film can be applied as an external layer attached to the bottom surface of a surfboard. In this form, the reflective film can be adhered to the bottom of the surfboard to cover the underside of the board. If required, reflective material can be applied to rails of the surfboard and also to parts of the deck. In some forms, the reflective film consists of various layers to create a reflective patterned camouflage effect as shown in FIG. 5. Advantageously, the external layer can protect the surfboard from scratches, abrasions and other damage. It should be noted that the reflective layer, when in the form of an internal or external film, does not need to be applied to the entire board. In some instances, boards may be designed to flex in particular regions. While it is advantageous from a camouflage perspective to cover the entire underside of the surfboard, along with the rails and part of the deck (i.e. for when the board is submerged), it is far more advantageous from a camouflage perspective to cover a portion the underside of the surfboard than to not cover it at all. Where required, the coverage area, coverage positions and orientation, along with film thickness can be adjusted to minimise the effect on the flex characteristics of the surfboard.

Figure 15:
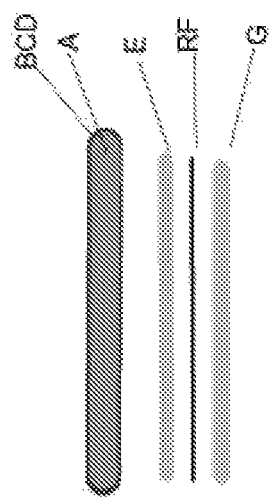
FIG. 15 shows an embodiment of the apparatus in the form of a reflective film that is adhered to the external underside surface of a surfboard.

FIG. 15 shows an embodiment of the apparatus in the form of an external reflective film. The film is a decal or sticker consisting of three layers, including an adhesive layer (E) suitable for marine environments, a layer (RF) for generating the reflective camouflage effect and a protective cover (G). The layers are welded or fused together by hot or cold lamination, by an internal adhesive or by another suitable method that ensures a bond that is, in at least one form, impervious to water. The adhesive used to attach the decal or sticker to the board is of sufficient strength to ensure secure attachment in seawater at a range of temperatures and movement speeds. In form, the reflective film is able to be removable by chemical (e.g. Eucalyptus oil) or mechanical means without damage to the top coat resin. The adhesive component may be as a separate layer constructed of a materiel suitable for marine conditions or as part of the layer that provides the reflective surface.

In some forms, a top or protective cover is constructed of a clear material suitable for marine conditions. The protective cover protects the internal layer that forms a reflective camouflage pattern from physical damage and radiation. The top protective layer is stable (i.e. remains transparent) over a period of time. In some forms, the top protective cover and base adhesive layer are made of the same materials and bonded to each other by a means that encapsulates the internal layer that provides the reflective surface.

In some forms, the adhesive or protection layer may not be required. For example, where the film is inherently durable, a protective layer may not be required. In some forms, the externally applied reflective film includes a non-uniform reflective value, as detailed with respect to the internally applied film. The described methods include printing on reflective film, perforation size and distribution, addition of reflective partials, painting and a defusing layer are all applicable to this embodiment.

In one form, the foam blank can be formed from a reflective material that when shaped retains its reflective properties. The shaped foam blank can then have fibreglass and clear resin applied to produce a reflective surfboard.

Figure 16B:
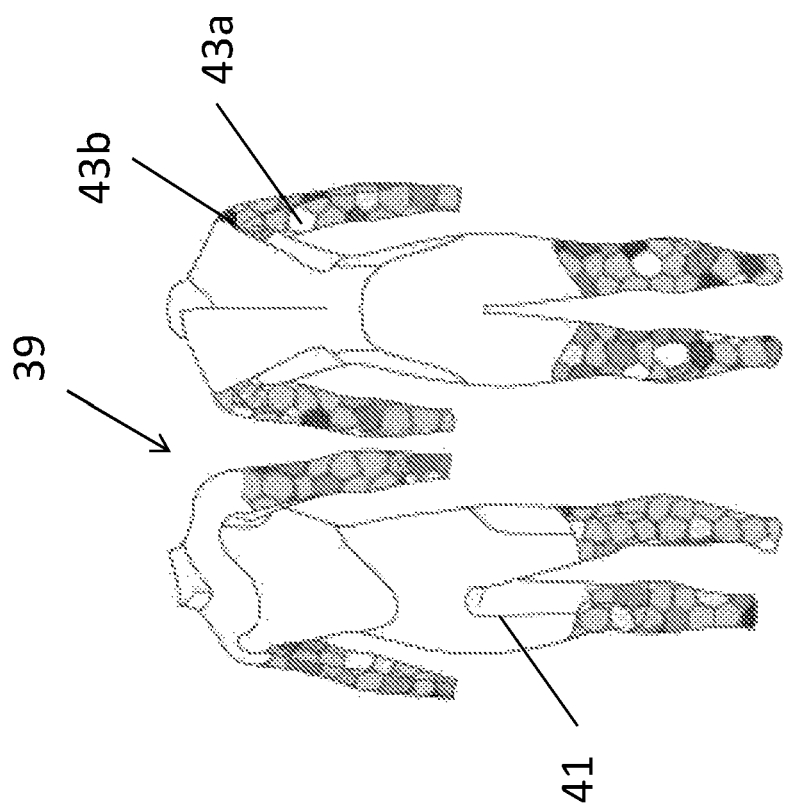
FIGS. 16a-b show wetsuits having reflective material disposed on the extremities.
Figure 16A:
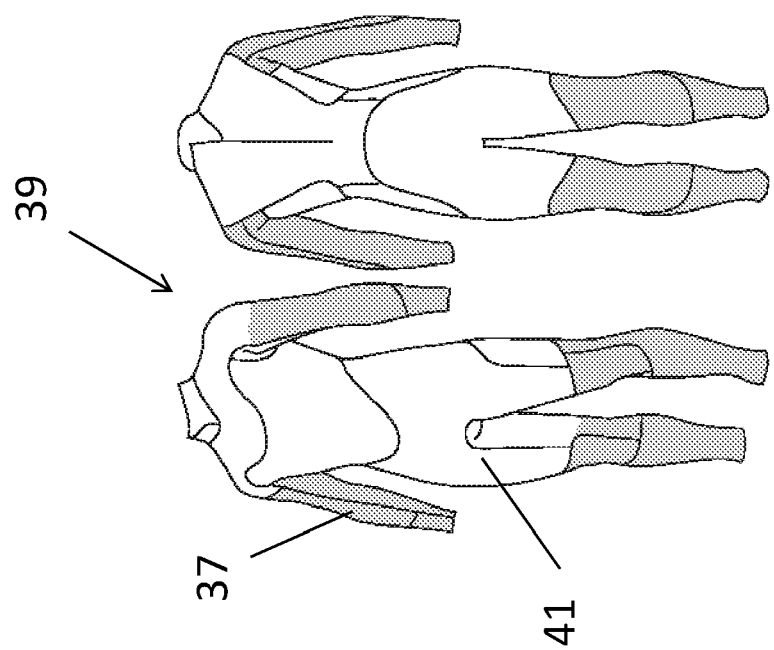

The most vulnerable and most often bitten body parts of surfers are the lower legs and feet. Bites to the arms are less common. As shown in FIGS. 16*a* and 16*b*, the effect of the reflective surfboard can be enhanced by using a reflective mirror material 37 on a wetsuit 39. The reflective material 37 can be applied to the front and/or back of the wetsuit. The reflective mirror material 37 can be metallic neoprene, lycra or spandex disposed on the extremities of wetsuits 39 in combination with the neoprene (e.g. black neoprene) 41 of the wetsuit 39. This combination of mirrors 37 can complete the camouflage effect. In one form, the reflective mirror material 39 can be used with Kevlar to form a last line of defence. In this form, the Kevlar can be included on the arms and legs within the neoprene of wetsuit materiel covering this area completely. Many shark attacks are of the "bite and spit" type. The tearing action of the shark teeth can cause severe wounds. In another form, the quality of Kevlar can be reduced and placed within the neoprene of the wetsuit in longitudinal bands. While this positioning of Kevlar would not prevent puncture wounds from shark bites, it reduces the amount of tearing wounds.

In some forms, the wetsuit consists of colours and patterns that are effective at disguising or hiding the surfer from an underneath viewpoint by disguising the shape and colour. Some sharks are unable to see colours and evidence suggest that sharks see in tones of green or blue giving a black and white with green or blue tint at very high contrast. In order to negate the uncertainty of the abilities of shark vision and encompass a variety of water parameters, a mixture of light to dark greys and whites to off whites can be used. For tropical waters where the water is very clear and light a greater proportion of lighter colours are more beneficial. Where the water is murky, dull colours are more beneficial.

To create the desired pattern, the pattern can be included within the neoprene of the wetsuit, or applied to the external surface (e.g. a layer of synthetic fibre such as Lycra or Spandex) of the wetsuit. In some forms only the arms and legs are covered with the desired pattern and colours. In other forms the complete wetsuit will be covered.

To further enhance the camouflage effect, soft curves between colours/shades, along with irregular shaping and random colour/shade distribution can be used. The size of the irregular shapes is dependent on the movement of the surface of the water with the greater the stillness the larger the shape and the more disturbance the smaller. While different sizes and shapes are useful, a general or average size and proportions are approximately the size of an adult male hand with projections without straight lines, sharp edges or regular shapes.

Figure 17A:
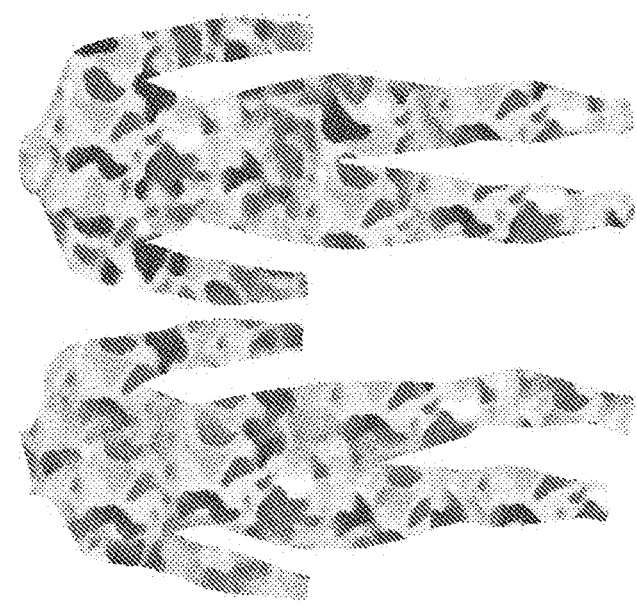
FIGS. 17a-b show wetsuits having camouflaged patterns disposed thereon.
Figure 17B:

In some forms, the camouflage pattern includes soft greys and off white colours with round shapes as shown in FIG. 17*a-b*. The colour palette and shapes applied to the wetsuit can match the underside of the surfboard. This combination of camouflage assists to camouflage both the surfer and the surfboard from a predator in the water. In other forms, a base layer of soft grey has the addition of an object likely to be avoided or not typically edible having encountered the object on the surface previously (e.g. Blue Bottles, Box Jelly Fish, kelp, etc.).

In another form, a wetsuit 39 can include a plurality of reflective surfaces 43*a*, 43*b* can be applied in a camouflaged pattern to wetsuit 39 to enable the wetsuit to be affectively camouflaged in different environments and to be visually appealing. Reflective mirror material 37 can also be applied to wetsuit boots or gloves.

The effect created by the reflective material according to the present disclosure can vary with each attack attempt and match the attitude of the attacker. If the shark changes its angle of attack, the angle of the approaching shark will also vary. Changes in speed will also be matched. Higher aggressive actions will be met be the same higher aggressive actions. Importantly the little understood subliminal body posturing and signals used by sharks to determine dominance will be displayed. No matter the level of display the shark image will not back down. In the marine environment only dolphins and killer whales are considered to be self-aware. Sharks have very little ability to solve problems and can learning to identify a shape to get a food reward is the limit of their reasoning skills. Thus, the reflected image is always perceived by an approaching shark as another shark. Therefore sharks should not become accustomed to the effect of the reflective surface.

Advantageously, the disclosed deterrence method and apparatus is able to deter sharks whilst not harming or interfering with the sharks wellbeing or natural behaviour. Sharks can continue to use all their senses to detect food or prey items. On approach to within the range at which sharks rely on vision, the expected outline of a seal or other prey is distorted, not clear or confusing and the attack run may be aborted. At close range the shark will see a mass of reflective shapes and, as with fish schooling, this makes the identification of an individual difficult, and may lead to aborting the run. If the shark continues with the attack, an image starts be become apparent on the other side of the prey item. Once the shark is within a few meters of the surfboard, the image appears to be another shark approaching at speed. The other shark is perceived to be bigger and the attacker aborts its run to avoid collision or confrontation with the larger individual. Should the attacking shark wait to try a second attempt the larger shark again is there and the attack aborted. Having attempted to feed only to be confronted by a larger shark the attacker is most likely to leave the area.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

In the claims which follow and in the preceding summary except where the context requires otherwise due to express language or necessary implication, the word "comprising" is used in the sense of "including", that is, the features as above may be associated with further features in various embodiments.

Variations and modifications may be made to the parts previously described without departing from the spirit or ambit of the disclosure.

The invention claimed is:

1. An apparatus for deterring a shark comprising:
a first buoyant portion providing a support surface adapted to support a user thereon; and
a second portion locatable at the first portion, the second portion arranged to provide a reflective surface at the first portion on an opposite side to the support surface;
the reflective surface configured to reflect an image of a surrounding environment that is below the apparatus in use; and
wherein the reflective surface comprising a first reflective portion having a first reflective value of above 40% reflectivity and a second reflective portion having a second reflective value of above 40% reflectivity, wherein the first and second reflective values vary such that the first and second reflective portions provide a varying level of reflectivity.

2. An apparatus according to claim 1, wherein the reflective surface is in the form of a mirror film.

3. An apparatus according to claim 2, further comprising a protective layer for protecting the first and second portions, the protective layer comprising a bottom surface, a deck surface, and rail portions connecting the bottom and deck surfaces.

4. An apparatus according to claim 3, wherein the mirror film is disposed between the bottom surface of the protective layer and the first portion such that in use an underside of the apparatus is able to reflect the image.

5. An apparatus according to claim 4, wherein the second portion further comprises a magnifier for magnifying the reflected image, the magnifier being disposed between the mirror film and the protective layer for magnifying the reflected image.

6. An apparatus according to claim 4, wherein the mirror film is further disposed between the rail portions of the protective layer and the first portion.

7. An apparatus according to claim 4, wherein the mirror film is adhered to the bottom surface of the protective layer.

8. An apparatus according to claim 1, wherein the reflective surface comprises ink printed thereon to provide the varying level of reflectivity.

9. An apparatus according to claim 1, wherein the reflective surface comprises a plurality of apertures to provide the varying level of reflectivity.

10. An apparatus according to claim 1, wherein the reflective surface is adapted to reflect the image of an approaching shark.

11. An apparatus according to claim 1, wherein the second portion further comprises an adhesive layer for connecting the second portion to the first portion.

12. An apparatus in accordance with claim 1, wherein the first reflective portion has a first reflective value of above 50% reflectivity and the second reflective portion has a second reflective value of above 60% reflectivity.

13. An apparatus in accordance with claim 1, wherein the first reflective portion has a first reflective value of above 60% reflectivity and the second reflective portion has a second reflective value of above 70% reflectivity.

14. A method of retrofitting a watercraft for deterring a shark, the method comprising the step of adapting an underside surface of the watercraft to form a reflective surface able to reflect an image of a surrounding environment below the watercraft in use to deter the shark from the watercraft, the reflective surface comprising a first reflective portion having a first reflective value of above 40% reflectivity and a second reflective portion having a second reflective value of above 40% reflectivity, wherein the first and second reflective values vary such that the first and second reflective portions provide a varying level of reflectivity.

15. A method according to claim 14 further comprising locating a flexible mirror film adjacent the underside of the watercraft.

16. A method according to claim 15 further comprising adhering the flexible mirror film onto the underside of the watercraft.

17. A method according to claim 15 further comprising encapsulating the flexible mirror film within the watercraft.

18. A method according to claim 17 further comprising locating a magnifying layer over the flexible mirror film.

19. A method of constructing a watercraft for deterring a shark, the method comprising the step of;

locating a layer of reflective material at a buoyant portion such that the layer of reflective material forms an underside surface of the watercraft, wherein the first layer of reflective material is configured to reflect an image of a surrounding environment below the watercraft in use to deter the shark from the watercraft, the reflective material comprising a first reflective portion having a first reflective value of above 40% reflectivity and a second reflective portion having a second reflective value of above 40% reflectivity, wherein the first and second reflective values vary such that the first and second reflective portions provide a varying level of reflectivity.

* * * * *